Figure 1:
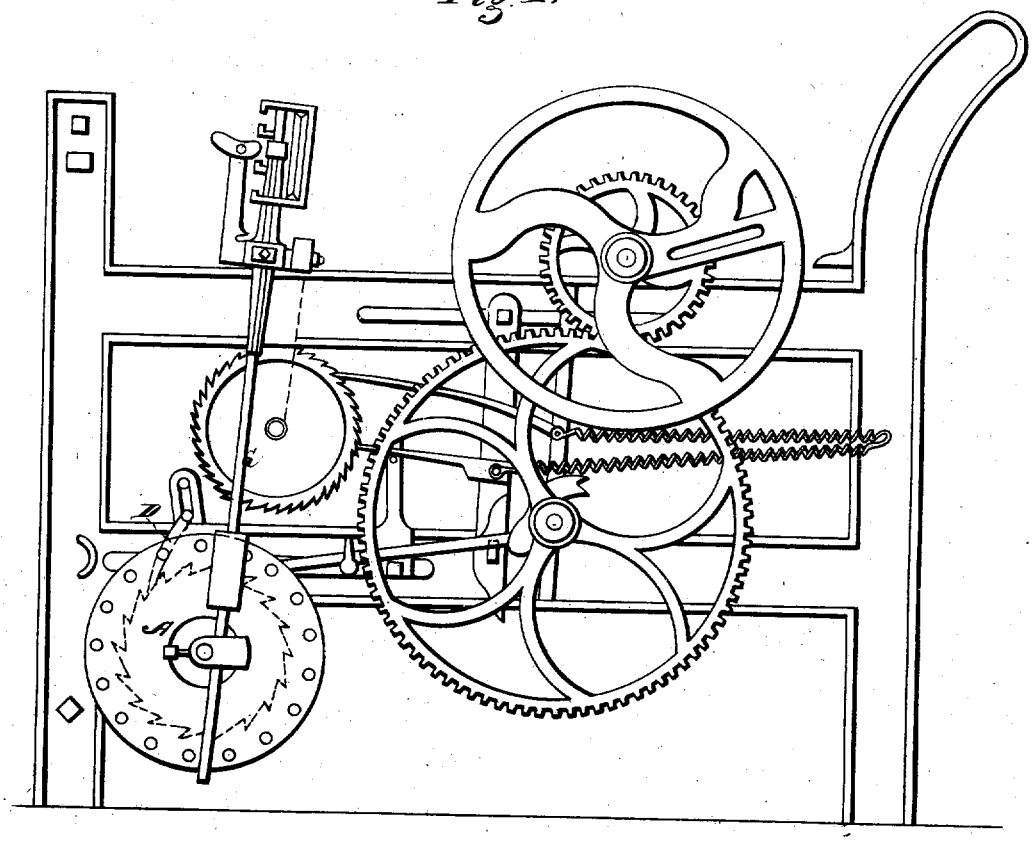

Sheet 1-2 Sheets.

R. B. Goodyear.

Shuttle Box.

No. 1,310. Reissued May 20, 1862.

Witnesses:
Edward Brown
[illegible] Child

Inventor:
Robert Burns Goodyear.

N. PETERS, PHOTO-LITHOGRAPHER, WASHINGTON, D. C.

Sheet 2-2 Sheets.
R. B. Goodyear.
Shuttle Box.
No. 1,310. Reissued May. 20, 1862.
Fig. 5.
Fig. 2.
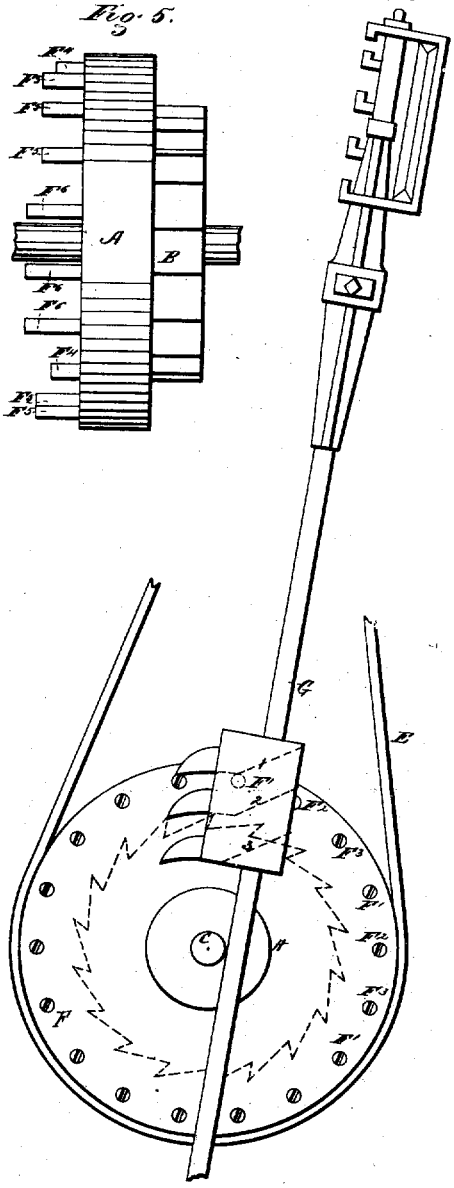
Fig. 4.
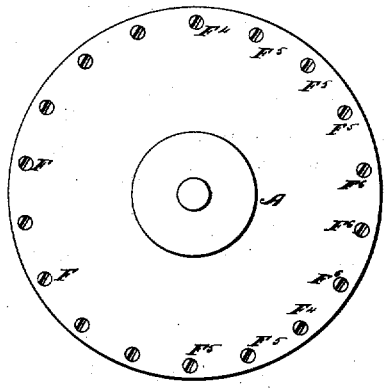
Fig. 3.
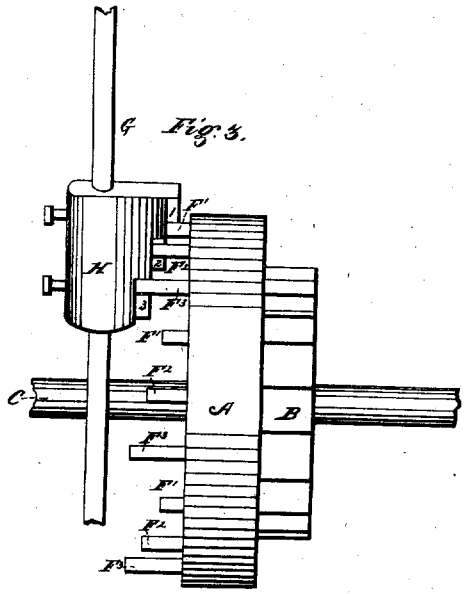
Witnesses:
Edward Brown
M. M. Mitchell
Inventor:
Robert Burns Goodyear
N. PETERS, PHOTO-LITHOGRAPHER, WASHINGTON, D. C.

UNITED STATES PATENT OFFICE.

ROBERT B. GOODYEAR, OF ELKTON, MARYLAND, ASSIGNEE, BY MESNE ASSIGNMENTS, OF HIMSELF.

IMPROVEMENT IN APPARATUS FOR OPERATING SHUTTLE-BOXES OF LOOMS.

Specification forming part of Letters Patent No. 6,170, dated March 13, 1849; antedated September 13, 1848; Reissue No. 242, dated June 14, 1853; Reissue No. 1,310, dated May 20, 1862.

*To all whom it may concern:*

Be it known that the following is a full, clear, and exact description of the method of raising the shuttle boxes of power-looms employing two or more shuttles, invented by me, and for which Letters Patent of the United States were granted to my assignees, JAMES A. BOWIE and CHARLES CARR, March 13, A. D. 1849, and reissued to them on the 14th of June, 1853, the said Reissued Letters Patent having been surrendered for the purpose of describing the same invention and pointing out in more clear, full, and exact terms than was done in specification attached to said reissued or to said original patent.

In the accompanying drawings, Figure 1 is a side elevation of a portion of a power-loom with the improvement attached. Fig. 2 is a side elevation of the wheel in which the pins for raising the shuttle-boxes are inserted, together with a set of cams attached to the shuttle-boxes, on an enlarged plan. Fig. 3 is a front view of the same. Fig. 4 is a side view of the pin or index wheel detached. Fig. 5 is a front view of the same with the pins projecting from its face to form a pattern different from the pattern for which the pins represented in Figs. 2 and 3 are set.

Similar letters in the several figures refer to corresponding parts.

The nature of this invention and improvement consists in the application of a novel and peculiar method of raising the shuttle-boxes in power-looms employing two or more shuttles for weaving striped, check, and other fancy goods, by which an almost infinite number of changes of patterns can be woven, a shuttle containing any desired color being raised and kept up while the number of picks of the weft required to form the pattern take place, by simply arranging a series of pins or screws inserted in what is termed an "index-wheel" in such relation to each other and the cams or other equivalents they are designed to operate as to correspond with the number, distance apart, and width of the stripe or check or other pattern previously determined on. The general construction of the loom in this case does not differ from power-looms now in use, and as their different parts are well known the description will be confined to what is claimed as new, except so far as it is found necessary to refer to parts which are old to illustrate the part claimed.

The index-wheel A, having a ratchet-wheel, B, secured on its side, as represented, is placed loosely on the horizontal shaft C at the lower part of the loom, and is kept from moving, except when pushed by the dog D, acting on the ratchet-wheel, by a friction-band, E, extending around the index-wheel and kept at the required degree of tension. Within about one inch (more or less) of the periphery of the index-wheel, and on its side, a number of holes are made, generally corresponding in number with the number of teeth on the ratchet-wheel. In these holes are screwed or otherwise inserted a number of pins, F, for operating cams or other devices having a connection with the shuttle-boxes, the number of said pins and the relative distances they respectively project from the face of the wheel being governed by the shuttle-boxes required to be raised and held up in the sley, to furnish the particular color or weft to form the pattern desired.

In order to illustrate the manner in which the pins F in the index-wheel operate on the shuttle-boxes through the cams or other devices, we will suppose the sley is formed to accommodate and is supplied with four shuttle-boxes and a like number of shuttles containing the colors of weft required, and the boxes are attached by a rod, G, to three cams or inclined planes, 1 2 3, formed on a hub or shoe, H, at different distances from its diameter and at different heights arranged outside the index-wheel, as shown in Figs. 2 and 3, and that it is desired to have the sley-sword successively shoot a different shuttle at every beat of the lathe in the order in which they are situated in the shuttle-boxes. The pins F in such a case are caused to project from the face of the index-wheel A in the order that those marked F′, Figs. 2 and 3, being every third pin, shall project just far enough to operate on the cam or inclined plane 1, nearest the face of the wheel, and raise the shuttle-boxes to a position at which the shuttle in the second box from the top will be used, and the next pins, $F^2$, or those of medium length, shall operate on the next cam or inclined plane, 2, and raise the shuttle-boxes as much higher, so as to put the shuttle in the third box into play; and the next pins, $F^3$, in succession, shall project as far beyond the medium-length pins 2 as they did beyond the first-numbered pins, 1, so that they will operate on the third cam or inclined plane, 3, and raise the boxes to put the fourth or lower box in play, and so on in this manner, alternately bringing the three lower shuttles into play as the index-wheel is revolved (at intervals of time) by the dog D, and producing a pattern equally diversified with the different colors of weft on the shuttles employed.

When it is desired to change the pattern, the pins F in the index-wheel A are either removed from the same or their ends moved farther from or nearer to the side or face of the wheel, to correspond with the pattern desired. In Figs. 4 and 5 the pins F have been so arranged in relation to each other and the face of the index-wheel that the particular pins marked $F^4$ will during their revolutions act on cams or other devices and bring the shuttle in the second shuttle-box from the top into play for one pick of weft, the three next pins, $F^5$, will in like manner cause a corresponding number of picks of weft from the shuttle in the next or third shuttle-box, and the three pins $F^6$, next in succession, will cause the same number of picks of weft from the shuttle in the fourth box; and in the same order a like number of picks of weft from the respective shuttles will be successively obtained as the revolutions of the index-wheel are continued.

Having thus fully described the method of raising the shuttle-boxes of power-looms having two or more shuttles, what I claim therein as my invention, and desire to secure by Letters Patent, is—

The employment, for the purpose of weaving, of an index-plate having movable and adjustable pins projecting at different distances from the face of said plate, in combination with the shoe H or its equivalent, for the purpose of raising and falling the shuttle-boxes to correspond with the pattern desired to be formed, the whole constructed and arranged in the manner herein described.

ROBERT BURNS GOODYEAR.

Witnesses:
M. MINICHILD,
JAMES MCCALUN.